Dec. 7, 1965  J. H. LUX  3,221,954

BLOW MOLDED FOAMED PLASTIC CONTAINER

Filed June 11, 1963

INVENTOR
JOHN H. LUX

BY *Cushman, Darby & Cushman*
ATTORNEYS 3,221,954
BLOW MOLDED FOAMED PLASTIC CONTAINER
John H. Lux, Charlestown, Md., assignor, by mesne assignments, to Haveg Industries, Inc., a wholly owned subsidiary of Hercules Powder Company, New Castle, Del., a corporation of Delaware
Filed June 11, 1963, Ser. No. 287,129
13 Claims. (Cl. 222—566)

This invention relates to improvements in blow molded plastic foam containers.

When an attempt is made to apply closure devices to blow molded containers by heat sealing a very inferior product is obtained. It is difficult to obtain a tight seal between the closure and the container because of the porous nature of the surface at the point of juncture. Likewise, heat transfer for successful heat sealing is very difficult to achieve and control. The use of adhesives or cements which result in higher costs is thus essentially unavoidable.

The preparation of blow molded containers from high density thermoplastic resin foams consisting of (1) a high density foam resin core, (2) a non-porous, impervious, tough resin outer skin, and (3) a non-porous, impervious tough resin inner skin, the core being between 50 and 94% of the total thickness of the skins and core, and the core being integrally united to the skins is disclosed in Noland et al. application Serial No. 274,650, filed April 22, 1963. The entire disclosure of the Noland et al. application is hereby incorporated by reference.

It is an object of the present invention to prepare blow molded plastic foam containers with closures which can be opened or closed at will.

Another object of the invention is to provide closures for blow molded plastic foamed containers having inner and outer impervious skins.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by applying a preformed molded closure to a blow molded, foamed, thermoplastic container of the type set forth in the Noland et al. application Serial No. 274,650.

The blow molded container consists of (1) a foam resin core, (2) a non-porous, impervious, tough resin outer skin, and (3) a non-porous, impervious, tough resin inner skin, said come comprising 50 to 94% of the total thickness of the skins and core, said core being integrally united to the skins. Generally, the core is at least 70% of the total thickness and the skins are each 3 to 15% of the total thickness, although each of the skins can be as much as 25% of the total thickness.

The blow molded containers are stretched laterally, normally 25 to 400%, and preferably, 50 to 200%. Preferably, the containers are also stretched lengthwise, e.g., 25 to 400%, and, most preferably, 50 to 200%. Thus, the body of the container is oriented either uniaxially or biaxially.

The blow molded container made from the skinned foam can be formed from any of the moldable thermoplastic resins, including cellulose ethers and esters, e.g., ethyl cellulose, cellulose acetate, cellulose acetate-butyrate, homopolymers and interpolymers of monomeric compounds containing the $CH_2{=}C{<}$ grouping, such as olefins, e.g., ethylene, propylene, isobutylene, vinyl halides, e.g., vinyl chloride; vinylidene chloride; vinyl esters of carboxylic acids, e.g., vinyl acetate, vinyl stearate, vinyl benzoate; vinyl ethers, e.g., vinyl methyl ether, vinyl ethyl ether, vinyl isobutyl ether; chlorotrifluoroethylene; unsaturated carboxylic acids and derivatives thereof, e.g., acrylic acid, methacrylic acid, methyl acrylate, ethyl acrylate, methyl methacrylate, acrylamide; acrylonitrile, methacrylonitrile, and interpolymers of the above-mentioned vinylidene monomers with alpha, beta-unsaturated polycarboxylic acids and derivatives thereof, e.g., maleic anhydride, diethyl maleate, dibutyl fumarate, diallyl maleate, dipropyl maleate, etc. A preferred class of materials are homopolymers and interpolymers of vinyl chloride; homopolymers of vinylidene aromatic hydrocarbons and ring halogenated derivatives thereof, e.g., styrene, o-chlorostyrene, p-chlorostyrene, 2,5-dichlorostyrene, 2,4-dichlorostyrene, p-methylstyrene, p-ethylstyrene, alpha-methylstyrene, vinyl naphthalene and interpolymers of such vinylidene monomers with each other and with other vinylidene monomers in which the interpolymer contains at least 70% of the vinylidene aromatic hydrocarbon compound.

Other suitable thermoplastic resins include polycarbonates, e.g. the polymer from bisphenol A and diphenyl carbonate; polyurethanes, e.g., from toluene diisocyanate and polypropylene glycol molecular weight 2025; Dacron (polyethylene terephthalate); nylon (e.g., polymeric hexamethylene adipamide); ABS terpolymers, e.g., the terpolymer of 25% butadiene, 15% acrylonitrile and 60% styrene (a rigid ABS terpolymer), as well as other terpolymers containing 25 to 60% butadiene, 10 to 20% acrylonitrile and 20 to 60% styrene.

The blow molded skinned foam containers are preferably formed from foamed polystyrene, foamed polyethylene of high density, e.g., 0.960, medium density, e.g., 0.935, or low density, e.g., 0.914, foamed polypropylene, foamed copolymer of ethylene and propylene, e.g., a 50:50 molar copolymer, foamed vinyl chloride polymer, e.g., polyvinyl chloride or vinyl chloride-vinyl acetate (87:13) copolymer or foamed polyurethanes. Examples of foamed polyurethanes are foams made by foaming prepolymers of polypropylene glycol 2025 molecular weight-toluene-2,4-diisocyanate, trimethylol-propane-propylene oxide adduct molecular weight 418-toluene 2,4-diisocyanate, 1,4-butanediol-adipic acid polyester-toluene 2, 4-diisocyanate, glycerine-propylene oxide adduct molecular weight 1000-toluene 2,4,6-triisocyanate. In fact, any of the conventional polyols and organic polyisocyanates can be used to form the prepolymer to form the foamed polyurethanes. Thus, there can be used any of the polyols, polyisocyanates or prepolymers disclosed in Knox Patent 3,079,641, or Friedman Patent 3,081,331 in making the polyurethanes. The entire disclosure of the Knox and Friedman patents is herein incorporated by reference.

When employing polystyrene, there can be used normal crystal grade polystyrene or high impact polystyrene of a mixture containing 5 to 95% normal crystal grade polystyrene and the balance high impact polystyrene. When employing a thermoplastic styrene polymer, it normally contains greater than 50% by weight of styrene and preferably at least 70% by weight of styrene in its structure, e.g., a copolymer of 70% styrene and 30% acrylonitrile. High impact polystyrenes are frequently prepared by polymerizing monomeric styrene in the presence of 2½ to 10% by weight of a rubbery diene polymer or by polymerizing styrene in the presence of such amounts of a difunctional material. Examples of high impact styrene polymers include a terpolymer of 5% acrylonitrile, 5% butadiene and 90% styrene; a copolymer of 5% butadiene and 95% styrene; the product made by polymerizing 95% of styrene in the presence of 5% polybutadiene; a copolymer of 5% chlorosulfonated polyethylene and 95% styrene; a blend of 97.5% polystyrene and 2.5% polybutadiene; a blend of 95% polystyrene and 5% of hydrogenated polybutadiene containing 35.4% residual unsaturation, polystyrene formed in the presence of 5% hydrogenated polybutadiene containing 4.5% of residual unsaturation; a blend of 95% polystyrene and 5% polyisoprene; and a copolymer of 99.5% styrene and 0.5% divinyl benzene.

The foamed containers usually have a density between 5 and 45 lbs./cu. ft. Preferably, high density foams are used with a density between 12 and 35 lbs./cu. ft. The foamed containers have wall thicknesses of 10 to 300 mils.

According to the invention closure devices which can be opened or reclosed at will are heat sealed to the skinned foamed plastic container. The closure can be heat sealed onto the foamed plastic container either prior or subsequent to the blow molding operation. Such closure devices include a molded nozzle with a removable screw cap, a ringed nozzle with a compression snap-on cover, a plastic zipper, lug closure, crown closure or a spigot which can be opened and closed. The material used to form the closure can be of metal, e.g., aluminum, steel, or tinplate, glass, wood, plastic or other material which is capable of being sealed to the plastic of the container proper.

Preferably, the material of the closure at the point at which it is heat sealed to the foamed plastic is a plastic material which will soften adequately at heat sealing temperatures to form an adequate bond with the foamed plastic of the container.

The closure can be compression or injection molded of any of the polymers and copolymers set forth above. Thus, it can be made of high impact polystrene, (e.g., polystyrene containing 5% polybutadiene), acrylonitrile-butadiene-styrene terpolymer (15:25:60) nylon (e.g., epsilon caprolactam polymer), rigid polyethylene (density 0.96), polypropylene, glass impregnated with an ethylenically unsaturated polyester, e.g., styrene modified-propylene glycol-ethylene-adipate maleate polymer, phenol-formaldehyde, urea-formaldehyde, melamine-formaldehyde, Delrin (polyoxymethylene), epoxy resin, e.g., bisphenol A-epichlorhydrin resin.

The containers of the present invention can be used to package foods, e.g., milk, butter, ice cream, beer, soft drinks, alcoholic beverages, warm foods, such as soup, coffee, tea and hot chocolate, as well as for non-food uses, e.g., to package detergents, bleaches, cosmetics, suntan lotions, etc.

Unless otherwise indicated all parts and percentages are by weight.

The invention will be best understood in connection with the drawings, wherein:

FIGURE 2 is a vertical elevation, partially broken away in section, of a container and closure made according to the invention; and FIGURE 3 is a vertical elevation, partially broken away in section, of another container and nozzle made to the invention.

Figure 1:
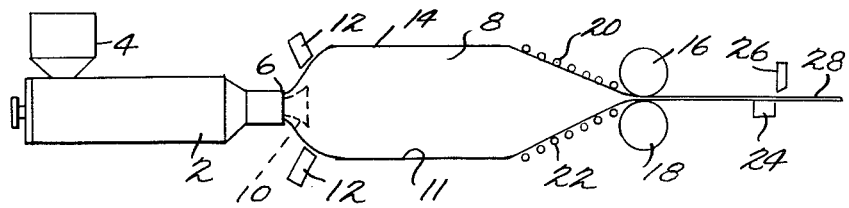
FIGURE 1 is a side view illustrating schematically one way of blowing a container body.
Figure 1:
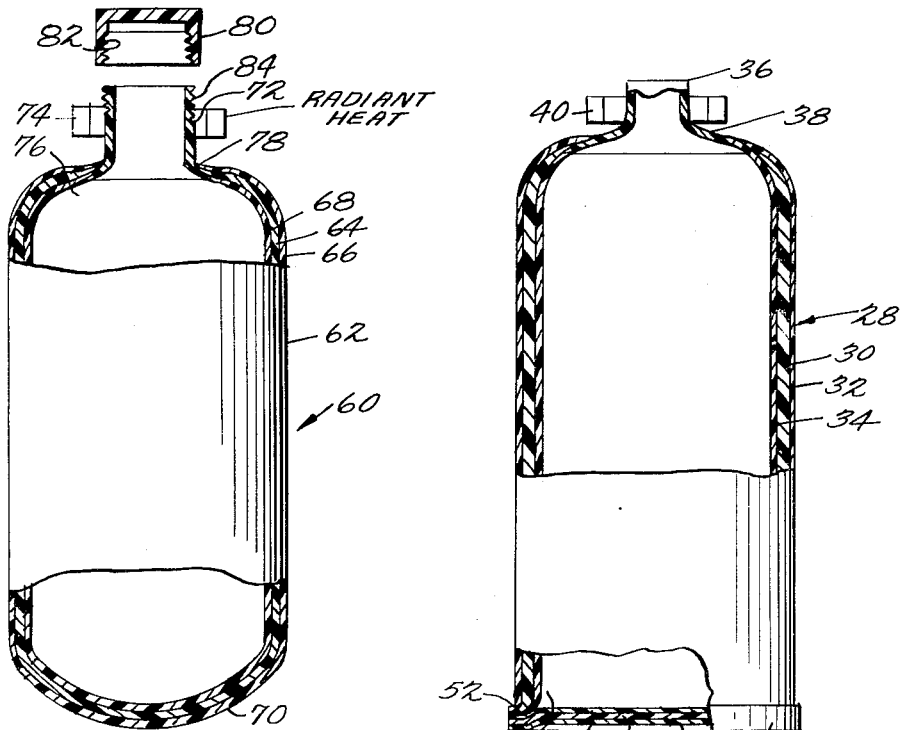

Referring more specifically to FIGURE 1 of the drawings, there was provided a continuous screw-type extruder 2. Pellets of a composition containing 50 parts of high impact polystyrene (Foster Grant's Tuflex 216, polystyrene modified with 5% polybutadiene) and 50 parts of regular polystyrene (Koppers Dylene 8) were prepared. This mixture is called hereinafter Composition A.

100 parts of Composition A were tumbled with 2 parts of Celite (diatomaceous earth) containing absorbed pentane. (The Celite-pentane contained one part of Celite and one part pentane.) There were then added 0.5 part of Bayol 35 (a petroleum aliphatic hydrocarbon white oil employed as a wetting agent) and a mixture of 0.3 part of powdered anhydrous citric acid and 0.4 part of powdered sodium bicarbonate. (The citric acid and sodium bicarbonate together acted as a nucleating agent.) This final mixture was tumbled for 16–20 minutes. The resulting composition is called hereinafter Composition B.

Composition B was placed in the hopper 4 of extruder 2 and then extruded in conventional fashion at 300° F. and 2500 p.s.i. The polystyrene foamed as it emerged from the extruder head 6 to form foamed seamless tube 8. This process is essentially the same as that shown in FIGURE 1 of Sisson Patent 2,917,217 execpt for the provision of quenching means as described hereinafter. Air at 70° F. and under pressure passes through nozzle 10 having an outwardly flared forward end to direct the air evenly toward the inner wall 11 of the tube and quench cool the same. The air had a velocity of 70 ft./sec. There was also provided a ring nozzle 12 which completely circumscribed the tube 8 adjacent the extruder head 6. Air from the ring nozzle 12 at 70° F. and 80 feet/sec. was directed at the outer surface or wall 14 of the tube to quench cool the same. The tube 8 was trapped between the extruder head 6 and the nip of driven squeeze rolls 16 and 18. The air inside the tube aided in ballooning the tube. The tube was stretched longitudinally 100% and circumferentially 100%, i.e., it was biaxially stretched 100%. The cooling of the inner and outer surfaces of the tube was insufficient to prevent foaming of the core. The foamed tube had a total thickness of 50 mils of which 5 mils was an impervious, tough outer skin, 5 mils was an impervious, tough inner skin, and 40 mils was the foamed core. The tube had a density of about 30 lbs./cu. ft. The tube was collapsed with the aid of two sets of flattening rollers 20 and 22 and then was passed over a cutting means comprising an anvil 24 and a reciprocating cutter 26 where the tube was intermittently cut to foam flattened container body walls 28 of predetermined length. The flattened body walls can then be reinflated in any desired manner, e.g., by passing air at room temperature through the tube to again force the tube to assume its cylindrical shape.

The manner of converting the container body wall foamed in FIGURE 1 into a container is shown in FIGURE 3.

The container body wall 28, as stated, is first reconverted by cylindrical shape. The body wall 28 is composed to the foamed polystyrene core 30 integrally united to the impervious, tough, unfoamed polystyrene outer skin 32 and impervious, tough, unfoamed polystyrene inner skin 34.

There is provided a spigot nozzle 36 injection molded of nonporous (i.e., impervious) nylon (polymeric hexamethylene adipamide). The nozzle is heat sealed to the body wall 28 in the joint area 38 by conduction from heated metal strip 40 which completely encircles the joint area at the time of sealing. Because of the tight skins 32 and 34 which are present on the body wall it is possible to unite the nozzle to the body without resulting in subsequent leakage at the juncture. The foam core between the two skins of the body wall provides for thermal insulation and mechanical rigidity with minimum use of material.

The containers of the present invention can be either top or bottom loaded.

The container shown in FIGURE 3 is of the bottom loading type.

After sealing the spigot nozzle 36 to the body wall, the container is inverted and filled, e.g., with bleach, through the opening 42 in the bottom of the container. There is provided a disc 44 of foamed polystyrene having a thickness of 50 mils and a density of 30 lbs./cu. ft. The disc has an impervious outer skin 46 of 5 mils, an impervious nonporous inner skin 48 of 5 mils and integrally united to said skins a foamed core 50 which is 40 mils thick. The disc 44 is heat sealed to the bottom portion 52 of the container 28 by use of an induction heater.

FIGURE 2 shows a blow molded foamed polystyrene bottle 60 prepared as described in Noland et al. application Serial No. 274,650, filed April 22, 1963.

The bottle was formed from a mixture of 90 parts of Composition A, 10 parts of Dow-Pelespan 101 (expansible polystyrene beads containing 6% pentane), 0.5 part of Bayol 35, 0.3 part of powdered anhydrous citric acid and 0.4 part of powdered sodium bicarbonate. This mixture was extruded with internal and external chilling of the surfaces to form a foamed parison having unfoamed inner and outer skins of 5 mils each and a foamed core of 100 mils. The parison was blow molded to form the bottle 60. There was a lateral stretching of 50%. Previously there was a 50% lengthwise stretching in forming the parison. The final foamed bottle walls were 50 mils thick.

The bottle 60 had a cylindrical main body wall 62. The body wall 62 was composed of an integral union of a relatively thick foamed polystyrene core 64 with non-porous tight outer skin 66 and nonporous tight inner skin 68. A bottom wall 70 was also formed during the blow molding operation and, as indicated, was composed of inner and outer nonporous skins integrally united to the foamed core.

An unfoamed threaded nozzle 72 of unfoamed rigid polyethylene (density 0.96) was also provided.

The top portion 76 of the blow molded container was accurately cut to provide a predetermined shaped opening as indicated to make it adapted to receive the threaded nozzle 72. Radiant heater 74 was provided to heat the line of juncture 78 of the nozzle 72 and the top portion 76 sufficiently that the foamed polystyrene softened. Mild pressure was applied at the juncture to insure a good weld of the nozzle to the body wall. The solid skins 66 and 68 insured a tight seal being obtained. There was also provided a cap 80 made of compression molded melamine formaldehyde and having internal threads 82 mating with the external threads 84 of nozzle 72.

The heat sealing temperature in the above examples was 300° F.

Normally the nozzles which are adhered to the blow molded container are not stretched significantly.

What is claimed is:

1. A container having (a) a blow molded container main body wall consisting of (1) a foam thermoplastic resin core, (2) a non-porous, impervious, tough, outer skin of the thermoplastic resin, and (3) a non-porous, impervious, tough, inner skin of the thermoplastic resin, said core comprising 50 to 94% of the total thickness of the skins and core, said core being integral with said skins, and (b) a nozzle of non-porous material directly welded to the top portion of said main body wall.

2. A container having (a) a tubular main body portion stretched at least 25% in one direction and consisting of (1) a foam thermoplastic resin core, (2) a non-porous, impervious, tough, outer skin of the thermoplastic resin and (3) a non-porous, impervious, tough, inner skin of the thermoplastic resin, said core comprising 50 to 94% of the total thickness of the skins and core, said core being integral with said skins and (b) a nozzle head portion of non-porous material directly welded to one end of said main body portion, said container being able to hold liquids without leakage even in the area of said weld.

3. A container according to claim 2 wherein said nozzle is made of plastic.

4. A container according to claim 3 wherein the nozzle is in substantially unstretched condition.

5. A container according to claim 4 wherein the main body portion is made of a resin selected from the group consisting of styrene polymers, polyethylene, polypropylene, ethylene-propylene copolymer, vinyl chloride polymers and polyurethanes.

6. A container according to claim 5 wherein the nozzle is a threaded nozzle.

7. A container according to claim 5 which is cylindrical in shape and which has a bottom wall integral with said main body portion.

8. A container according to claim 5 which is cylindrical in shape and which has a bottom wall welded to said main body portion.

9. A container according to claim 2 wherein said main body wall is biaxially stretched at least 25%.

10. A container according to claim 2 wherein the nozzle is made of plastic and is in substantially unstretched condition and the main body portion is made of a styrene polymer containing at least 70% styrene in its structure.

11. A container according to claim 2 wherein the nozzle is made of plastic and is in substantially unstretched condition and the main body portion is made of a polyethylene.

12. A container according to claim 2 wherein the nozzle is made of plastic and is in substantially unstretched condition and the main body portion is made of a polypropylene.

13. A container according to claim 2 wherein the nozzle is made of plastic and is in substantially unstretched condition and the main body portion is made of an ethylene-propylene copolymer.

References Cited by the Examiner

UNITED STATES PATENTS

| | | | |
|---|---|---|---|
| 2,274,258 | 2/1942 | Roselle | 222—107 |
| 2,307,817 | 1/1943 | Austin. | |
| 2,376,653 | 5/1945 | Boyer | 264—45 X |
| 2,552,641 | 5/1951 | Morrison | 222—107 |
| 2,682,974 | 7/1954 | Smith | 222—107 |
| 2,737,503 | 3/1956 | Sprague et al. | 229—2.5 X |
| 2,753,088 | 7/1956 | Prahl | 222—215 |
| 2,830,721 | 4/1958 | Pinsky et al. | 215—1 |
| 2,879,818 | 3/1959 | Root | 150—0.5 |
| 3,037,652 | 6/1962 | Wallace | 264—45 X |

FOREIGN PATENTS 845,060   4/1938   France.

RAPHAEL M. LUPO, *Primary Examiner.*

THERON E. CONDON, *Examiner.*